United States Patent [19]

Vincent

[11] Patent Number: 5,436,659
[45] Date of Patent: Jul. 25, 1995

[54] METHOD AND APPARATUS FOR DETERMINING DEFECTIVE PIXEL LOCATION

[75] Inventor: John A. Vincent, Rochester, N.Y.

[73] Assignee: Eastman Kodak Company, Rochester, N.Y.

[21] Appl. No.: 85,261

[22] Filed: Jun. 29, 1993

Related U.S. Application Data

[63] Continuation of Ser. No. 698,755, May 10, 1991.

[51] Int. Cl.$^6$ ............................................ H04N 5/335
[52] U.S. Cl. .................................... 348/246; 348/241; 348/247
[58] Field of Search ............... 358/213.17, 162, 163; 382/1, 8, 54; 348/246, 247, 241, 243, 248, 249, 250, 251

[56] References Cited

U.S. PATENT DOCUMENTS

| | | | |
|---|---|---|---|
| 4,167,754 | 9/1979 | Nagumo | 358/167 |
| 4,484,230 | 11/1984 | Pugsley | 358/284 |
| 4,805,023 | 2/1989 | Younse | 358/213.17 |
| 4,893,185 | 1/1990 | Fukushima | 358/213.17 |
| 4,910,598 | 3/1990 | Itakura | 358/213.17 |
| 4,941,186 | 7/1990 | Massmann | 382/54 |
| 5,047,863 | 9/1991 | Pape | 358/213.16 |

Primary Examiner—Joseph Mancuso
Assistant Examiner—Ngoc-Yen Vu
Attorney, Agent, or Firm—Thomas H. Close

[57] ABSTRACT

An application-specific integrated circuit (ASIC) that is programmable for provision of timing and control of imaging signals, including genclock and defective pixel correction function. The ASIC stores information regarding the existence of a next closely spaced defective pixel as the least significant bits of an n-bit words address of a previous defective pixel and compares only the X location information for the next pixel.

4 Claims, 8 Drawing Sheets

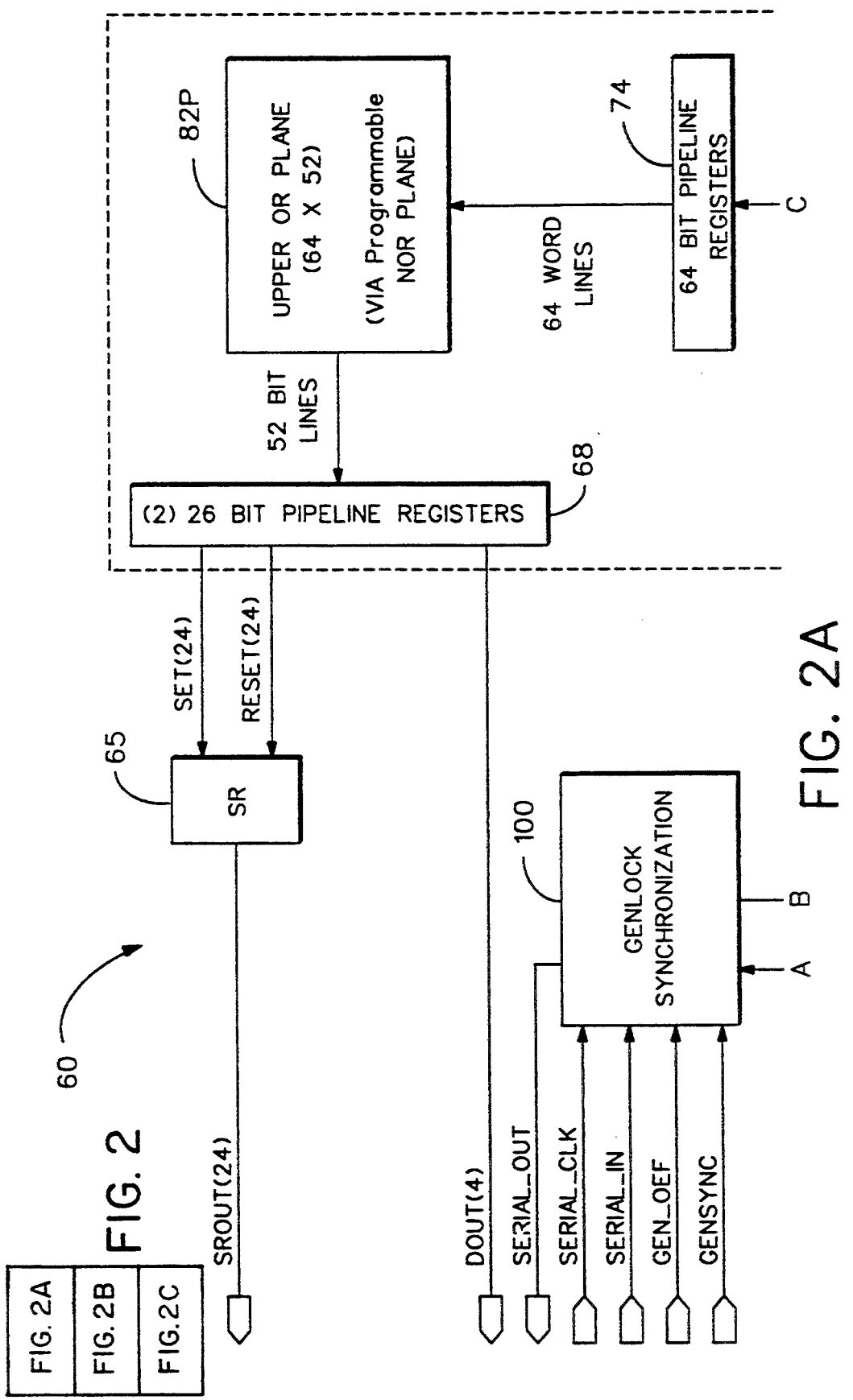

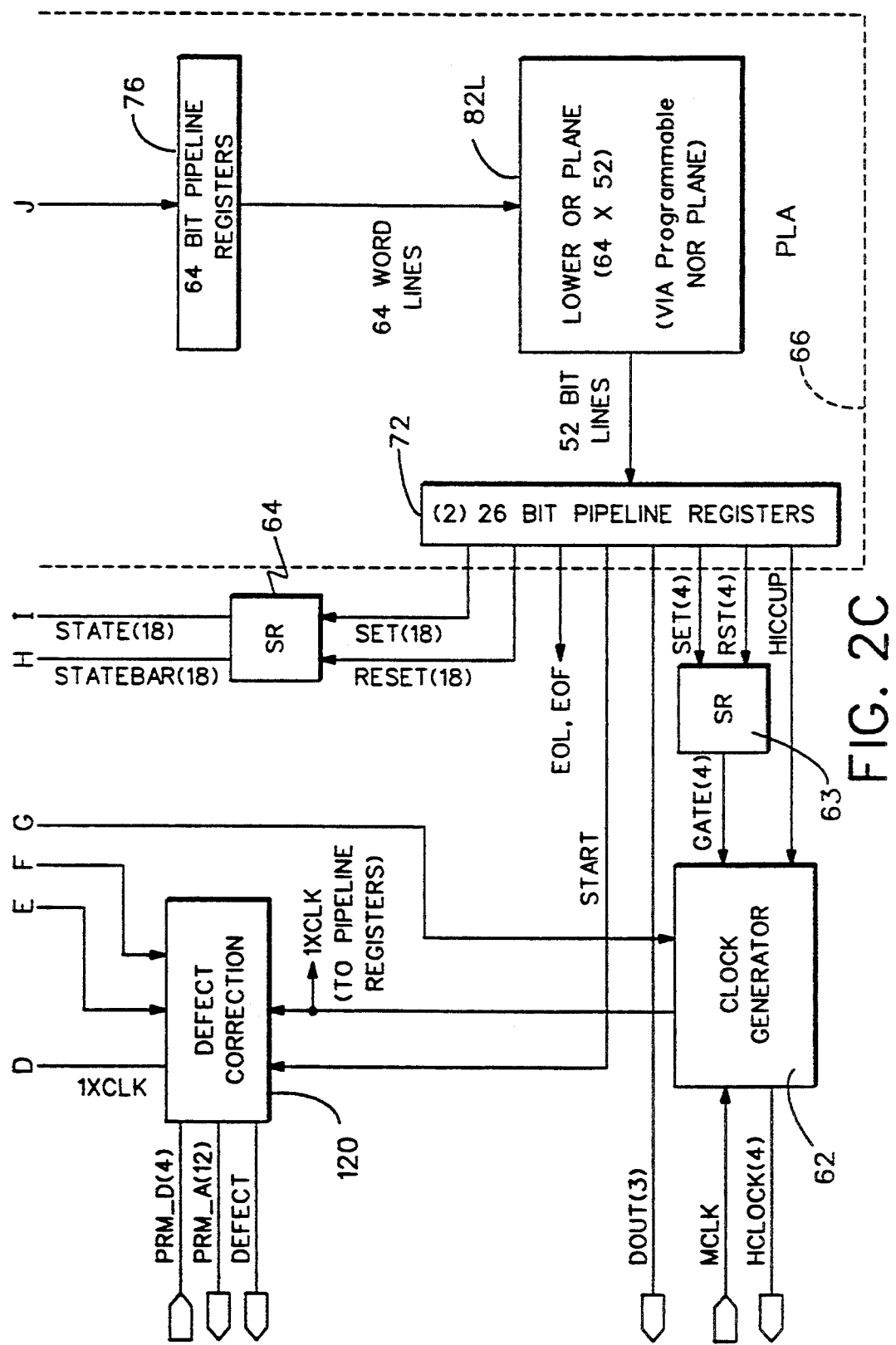

METHOD AND APPARATUS FOR DETERMINING DEFECTIVE PIXEL LOCATION

This is a continuing application of U.S. Ser. No. 07/698,755, filed May 10 1991 in the name of John Vincent, Lionel D'Luna and William Cook.

FIELD OF THE INVENTION

This invention relates to pixel defect correction apparatus and methods for producing defect location signals for digital systems used for imaging applications.

DESCRIPTION OF THE PRIOR ART

Electronic imaging systems are of increasing importance in electronic photography, video cameras, hybrid film/electronic systems, desktop publishing, personal computing, and a variety of consumer, industrial, and scientific applications. In many of such imaging systems, a variety of timing and control signals must be generated by a timing generator. Some of the timing signals are relatively slow, with few transitions; some signals are produced upon specific conditions, such as a particular combination of input signals; other signals are faster and have complex transition rates. The positioning of these timing signals (also known as clock signals) is critical.

During the development of such imaging systems, the system timing requirements are not fully known. However, some means for generating timing signals must be selected to initiate the design of the timing and control signal generator. In conventional practice, a number of different types of standard logic integrated circuits (I.C.'s) are chosen and interconnected to produce the required signals.

Unfortunately, the timing signal requirements typically change during the course of the development cycle, as the system components or features change, or as problems or deficiencies in the system hardware or software are encountered. As the production phase is approached, the timing logic design goes through several iterations. In fact, the timing specifications are often not finalized until all other parts of the system have been fully completed and integrated.

Later, in the production stage of the respective imaging system, the release of the imaging system as a commercial product is dependent upon the ability to transform the timing logic used in the development stage integrated circuits into production versions of those integrated circuits. This task is informally known as the turnaround of the development system. Quick turnaround of the system timing and control logic, in particular, is crucial, if a timely production schedule is to be met.

Therefore, there has been a need for a first means for developing timing and control logic for use in the stage of system integration and-development, and a second, associated means for quickly and conveniently implementing that logic in a cost-effective manner for commercial production..

The first means has been provided in an aid for electronic imaging systems development known as the Programmable Sequence Generator (PSG). This device is disclosed in the commonly-assigned U.S. Pat. No. 4,922,137, which issued May 1, 1990 in the name of Jeffrey A. Small, Mark D. Brown, and John A. Vincent. The PSG provides a flexible means of developing a timing and control logic architecture that is optimized for high speed electronic imaging system applications. The PSG is contemplated for use in development of an imaging system having an area image sensor or the like, and comprises a first pipeline register responsive to a plurality of external signals for providing word line signals, at least one EPROM transistor array responsive to the word line signals for selectively providing a plurality of different NAND or NOR functions of the word lines to produce output signals, and high speed logic responsive to the output signals to selectively produce timing signals.

However, the PSG is programmed by use of the EPROM transistors.; under certain conditions, such programming is subject to erasure. Although such conditions are infrequently encountered, the device is therefore not preferred for use as a production device.

A single customizable timing and control device has heretofore been unavailable for use as the production version of a timing and control logic device. The production designer typically resorts to implementing the timing and control logic by use of a multiplicity of dedicated logic circuits. The result, an aggregation of devices, is quite undesirable. The design process is made more complicated because of the disparity in the operating speeds, input/output protocols, and other characteristics of the devices in the aggregation. The translation of the development logic to the several dedicated integrated circuits is time consuming, error prone, and demands much redundant effort. The overall logic design will differ from application to application, and thus the aggregation is not versatile.

For example, to produce a single gate array, a designer must perform the steps of schematic capture or logic synthesis, circuit simulation, test vector generation, and at least three masks must be produced for any one device. The cost for each mask iteration is high and the time for design fabrication is long, and product delivery is delayed. (Further description of their drawbacks may be found in Meyer, Ernest, "Programmable Logic Strives to Replace Gate Arrays," *Computer Design*, July 1, 1989, pp. 51–60.)

In addition, a production timing and control logic I.C. would benefit from the inclusion of two additional functions that would be quite useful in many electronic imaging systems. Genlock is a function which refers to the synchronization of a video system timing relative to a reference video signal. It is often necessary, for example, in a broadcast studio environment, to synchronize the video output from several different video sources. A genlock functional block in a production timing and control I.C. would therefore provide a means for synchronizing the timing signals generated by the I.C. to an external reference source.

Defect correction denotes the capability of an imaging system for generating a signal that identifies the location of defective pixels in an image. The defective pixels may then be corrected or concealed by other signal processing circuitry to improve the overall quality of the image. For example, solid-state CCD image sources may contain defective pixel locations. To improve the appearance of the displayed image, signal processing circuits use the defective pixel location information to conceal the defects by substituting an adjacent pixel value for each defective pixel information. For an example of such signal processing, see "A Digital Video Signal Processor for Color Image Sensors", D'Luna, L. J., et al., *Proceedings of the IEEE 1989 International Solid State Circuits Conference*, February 1989, pp. 158-159, 323; "A Digital Signal Processor for Linear Sensors", Cook, W. A. et al., *Proceedings of the IEEE 1990 International Custom Integrated Circuits Conference*, May 1990, pp. 7.5.1-7.5.4.

To satisfy the speed, functionality, size, and power requirements required for compact electronic imaging systems, it is therefore desirable that the aforementioned development timing and control functions be implemented in a single, customizable application-specific integrated circuit.

SUMMARY OF THE INVENTION

Accordingly, the present invention is directed to a customizable application-specific integrated circuit (ASIC) available from various vendors including Texas Instruments, Motorola and NCR for generating timing and control signals, and provides genlock and defect correction functions, so as to solve the above-mentioned difficulties.

The customizable timing and control ASIC may be constructed according to the invention to facilitate quick turnaround of the development stage timing and control logic. The contemplated ASIC complements the development-stage timing and control logic and is well suited for production applications. By eliminating redundancies in the design process, the contemplated ASIC requires minimal design effort.

The contemplated ASIC is VIA-programmable, allows rapid fabrication turnaround time and automated test vector generation with high fault coverage, and may be readily adapted to new technology such that the basic architecture may be used in a wide variety of applications. The device can be used in NTSC, CCIR 601, and PAL/SECAM video systems, and its flexible architecture makes it suitable for use in a wide variety of other applications as well.

The contemplated ASIC includes two embedded counters, a VIA-programmable logic array, a high speed clock generation logic block, and internal state registers. "VIA-programmable" indicates an integrated circuit that is customized by applying a level of custom interconnections (vias) to a standard integrated circuit as a step in the fabrication of the integrated circuit. The programmable logic array preferably forms sum of products terms from its inputs; these sum of products can be direct (combinational) outputs, or the outputs can come from registers or macrocells which use the sum of products to create and/or control the outputs.

Each of the counters is of programmable length and receives control inputs from the programmable logic array. The counter output bits are inputted to the programmable logic array.

The state registers use outputs from the programmable logic array to form other signals which are fed back as inputs to the programmable logic array. These signals provide means for implementing state machines, providing gating signals, and other control purposes.

The high speed clock generation logic contains the necessary logic for generating internal clock signals from a reference timing signal. Included in this block is logic to divide down the frequency of the master timing signal, and logic to generate high speed clock signals which are gated on and off by output signals from the programmable logic array.

In addition, a defect correction block and a genlock block are included to enhance the functionality of the contemplated ASIC for product applications. The defect correction block provides means for identifying the locations of defective pixels in the image sensor and generating appropriate signals so that external signal processing circuitry can correct the defective pixels. The genlock block receives external control signals and outputs control signals to load the counters so that the timing signals generated by the ASIC reflect a desired (and adjustable) relationship with a reference video signal or event.

A preferred embodiment of the contemplated ASIC has been designed in 2 $\mu$m CMOS to operate at 20 MHz, using silicon compiler techniques and tools available from Silicon Compiler Systems (now part of the Silicon Design Division, Mentor Graphics Co., Wilsonville, Oreg.).

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

PREFERRED EMBODIMENT OF THE INVENTION

Because imaging systems in general are well known, the present description will be directed in particular to elements forming part of, or cooperating more directly, with the present invention. Apparatus not specifically shown or described herein are selectable from those known in the prior art.

Figure 1:
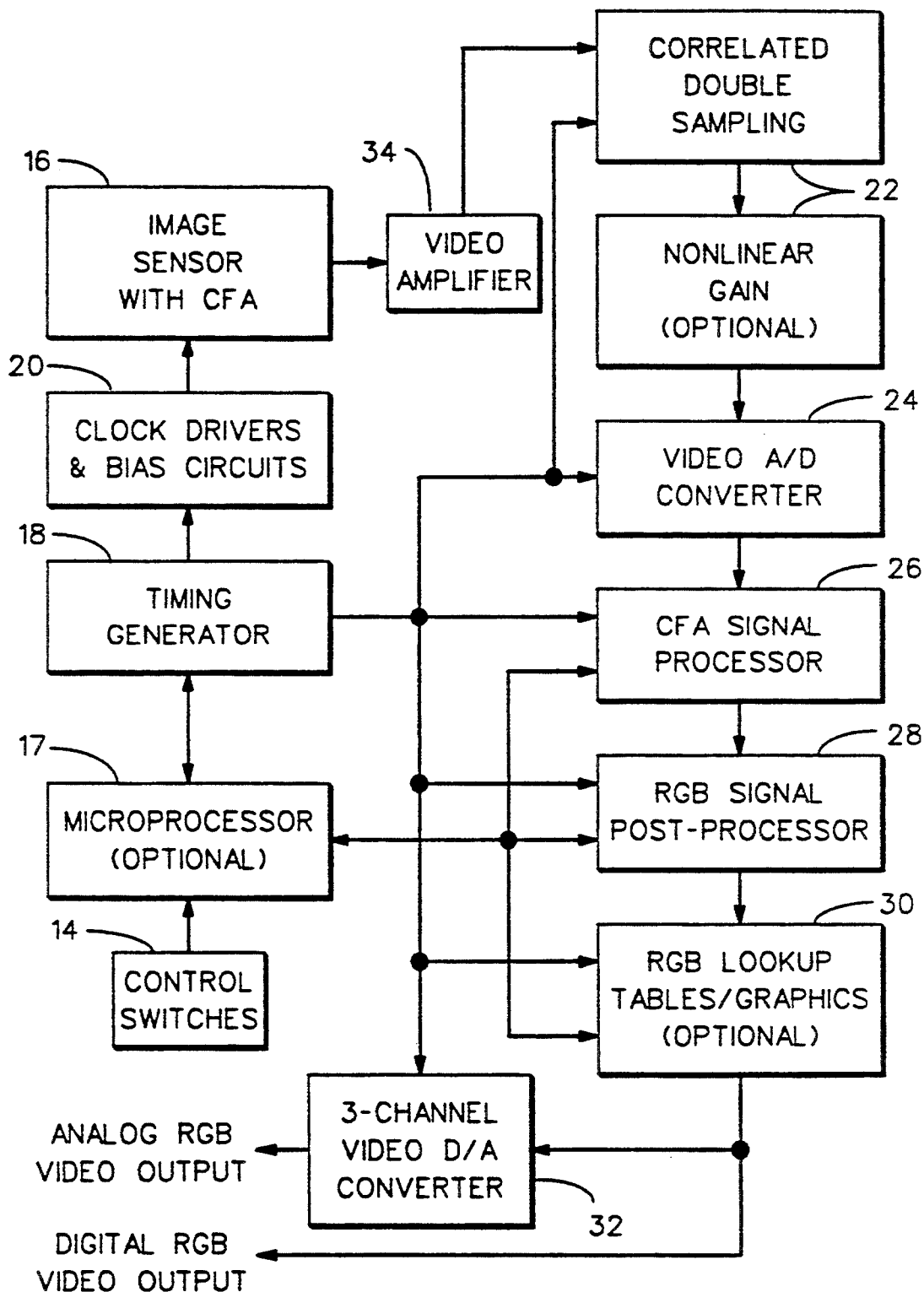
FIG. 1 is a schematic view of one embodiment of an imaging system which may benefit from the practice of the present invention.

FIG. 1 illustrates a digital imaging system 10 in block diagram form. Such a system is known in the art, and therefore it will be briefly described. Inputs from control switches 14 and the light image sensed by an image sensor 16 are received by the system 10. An optional microprocessor 16 interacts with a timing generator 18, which in turn provides timing and control signals to clock drivers 20, sampling circuitry 22, analog to digital converters 24, color filter array (CFA) signal processor 26, RGB signal post-processor 28, RGB lookup tables 30, and video digital to analog converters 32. Other ancillary circuitry such as a video amplifier 34 may be included.

The present invention is directed to a customizable timing and control ASIC for use in place of the conventional timing generator 18, and the latter has accordingly been illustrated merely in block form. However, the imaging system illustrated in FIG. 1 should not be considered limiting, as the contemplated ASIC provides more than a simple timing generation function, and furthermore the contemplated ASIC offers benefits to imaging systems other than the one shown in FIG. 1.

Figure 2B:
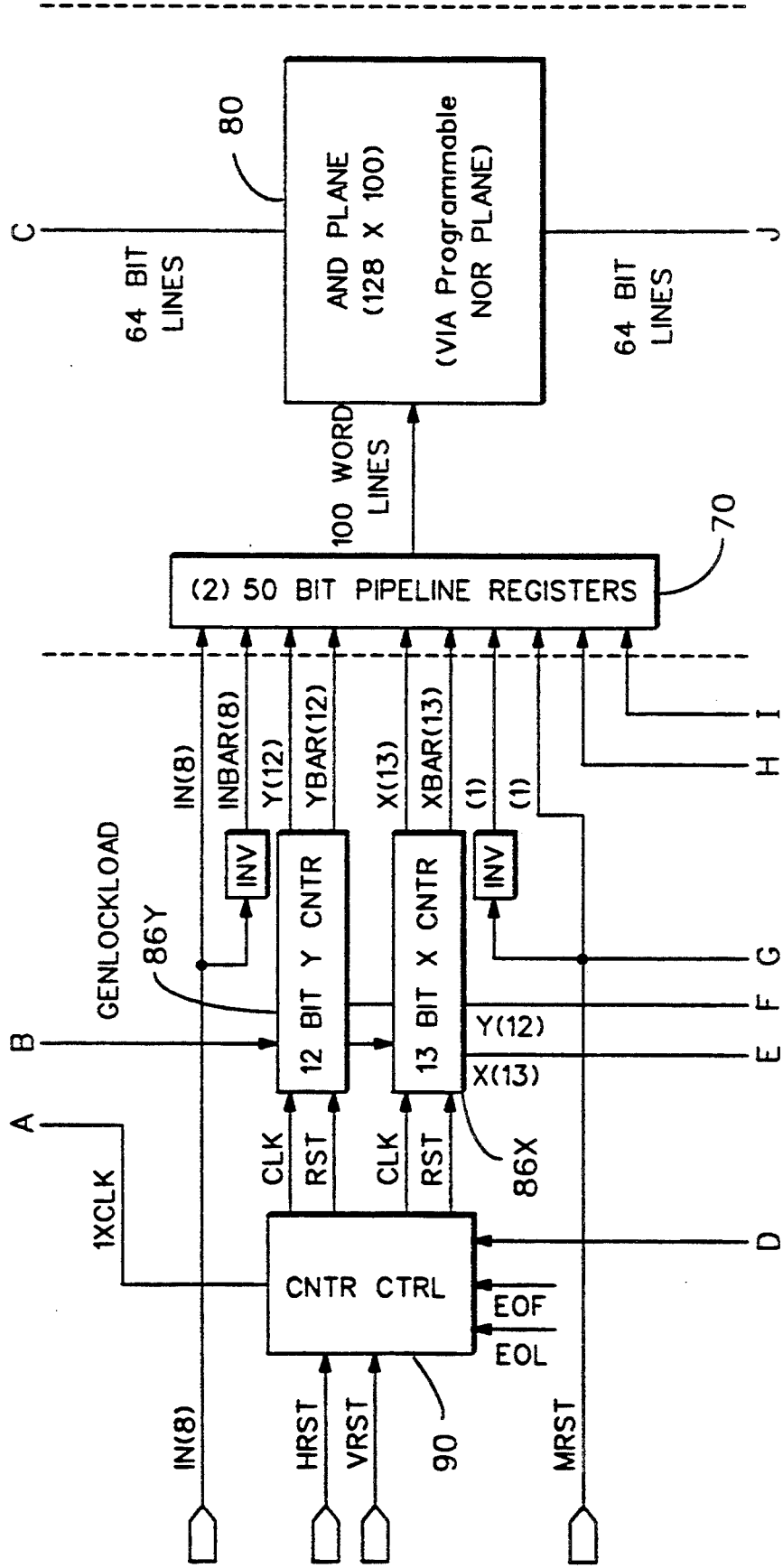
FIG. 2 is a schematic representation of a customizable timing and control ASIC constructed according to the invention for use in the imaging system of FIG. 1.

FIG. 2 shows the device architecture 60 of a customizable timing and control ASIC constructed according to the present invention. Operationally, the ASIC can be viewed as two communicating synchronous state machines. State machines are logic circuits containing memory elements whose behavior can be completely described in terms of the circuit inputs and the "state" of the memory elements. A first synchronous state machine is provided in the form of a clock generator block 62 that is clocked according to a reference master clock line MCLK. This state machine provides several functions. It creates pixel rate timing signals HCLOCK(4) and 1XCLK running at a selectable frequency derived from a reference (master) timing signal MCLK. The frequency of the pixel rate timing signals is selectable at the rate of the reference clock line MCLK or an integer divisor of thereof.

Pixel rate timing signal 1XCLK is an internal clock signal, which is used to clock the second state machine (hereinafter referred to as the core state machine). In addition, the four pixel rate timing signals HCLOCK(4) are created by the clock generator and outputted to the imaging system 10. These pixel rate timing signals are used to create the clocks for the horizontal shift registers of devices in the imaging system such as a CCD imager and for generating pixel rate clocks needed in the signal processing chain; further details are disclosed by Parulski, K. A., et al., "A Digital Color CCD Imaging System Using Custom VLSI Circuits," *IEEE Transactions on Consumer Electronics*, Vol. 35, No. 3, August 1990, pp. 382–389.

Each pixel rate timing signal HCLOCK(4) has dedicated gating signals GATE (4), derived from set and reset signals SET (4) and RST (4) created by the core state machine, which controls the gating signals. The set signal will control the conditions for which the pixel rate timing signal is gated on (i.e., for effecting a clock at the pixel rate). The reset signal determines the conditions for the pixel rate timing signal to be gated off.

The pixel rate timing signals HCLOCK(4) are in practice offered on separate lines (not shown for clarity). On first and second lines, the signals are gated on in phase with respect to the clock pulses in pixel rate signal 1XCLK when gated on and respectively high and low when gated off. On the third and fourth lines, the signals are 180 degrees out of phase with respect to the clock pulses in pixel rate signal 1XCLK when gated on and respectively high and low when gated off. This provides all combinations of phase and gated-off states at different output pins of the ASIC 60, enabling simple and direct creation of appropriate clock signals, as may be required for typical imaging system applications and the requisite signal processing.

The first state machine synchronizes a master reset line FIRST to create an internal reset signal. The master reset MRST may be processed by the clock generator block 62 and then is provided to the core state machine if necessary for initialization purposes. The clock generator block 62 also receives signals from lines HICCUP and GATE from the core state machine. Such signals are received for controlling the pixel rate clock signals.

The clock generator 62 is held in its initialization state when line MRST is high. When line MRST goes low, the clock generation state machine begins operation. In this way, signals on line MRST ensure a well-ordered startup of clock generation and can be used to provide synchronization of the clock phase at any time.

The HICCUP feature is incorporated in the circuitry of the clock generator 62 and is controlled by an output from the programmable logic array 66 and causes the duration of the pixel rate clock cycle to be extended by $\frac{1}{2}$ its normal period. Hence, a shift in the timing may be effected. This capability is very useful in producing the required timing in NTSC systems in which the pixel clock frequency is an odd multiple of the color subcarrier, where the line time is an odd number of half cycles of the pixel clock. Further details of the contemplated hiccup function may be found in U.S. Pat. No. 6,922,137, Small et al., "Programmable Sequence Generator," issued May 1, 1990, the disclosure of which is included herein by reference.

The core state machine includes a very large programmable logic array 66 that is programmable at the VIA mask level. The other major blocks that make up the core state machine are the counter control logic 90, state latches 64, genlock synchronization block 100, and defect correction block 120.

The contemplated programmable logic array (also known as a PLA) 66 provides a very flexible means of realizing complex timing logic and provides an architecture that allows the same device to be used in a wide variety of systems. Merely changing the programming of the programmable logic array PLA customizes the device for the respective application. The programmable logic array 66 is pipelined, with multibit pipeline registers 68, 70, 72 at its inputs and outputs and also multibit pipeline registers 74, 76 between the AND and OR logic planes 80, 82P, 82L. Though it is not shown for clarity, the data flow between the logic planes 82L, 80, and 82P may be selectable through the pipeline registers 74, 76 or alternatively through an adjacent data channel (not shown) between the logic planes 82L and 80, and between logic planes 80 and 82P. Such an arrangement is useful for test purposes.

Inputs to the programmable logic array 66 come from internal X and Y counters 86X, 86Y, internal state latches 64, external inputs IN(8), and the master reset signal MRST. The eight external inputs IN(8), which come directly into the programmable logic array PLA from external pins, can be used for a variety of purposes, including selecting 2modes or operation, providing gating control signals, and initiating procedures in response to signals from the rest of the system.

The programmable logic array 66 provides a large number of outputs: signals for controlling the state latches 64 and signals for controlling the gating of the high speed clocks (both of which have been discussed), D-type outputs DOUT(4), DOUT(3), 24 SR-type outputs SROUT(24), and several miscellaneous control signals such as a HICCUP signal.

The outputs DOUT(4), DOUT(3) are the D-type outputs of the programmable logic array 66 provided directly to output pins. The SR-type outputs SROUT(24) are created by using outputs of the programmable logic array PLA to serve as dedicated set and reset signals. These signals drive unclocked SR-type state latches 65 to form the SROUT(24) signals seen at the output pins.

The state latches 64 allow the implementation of internal state machines for control purposes, and provide gating signals to simplify the generation of complex waveforms, such as are found in the composite sync signal and composite blank signal used in current video system applications. The state latches can also be used to extend the length of either or both of the internal counters to support larger raster sizes, if necessary. The state latches 64 are unlocked SR-type latches and are controlled by the outputs of the programmable logic array 66.

In some systems, it may be necessary to generate some timing signals whose transitions occur on the opposite clock edge from the others. This phase shifting capability is provided for all of the D-type and SR-type outputs DOUT(3), DOUT(4), and SROUT(24), and is selectable on an individual output basis by VIA selections.

Because imaging system applications span a wide range of resolutions, the two internal counters 86X, 86Y are usable as image data row and column counters. They offer programmable lengths and are used to define the image raster. For example, current NTSC video resolutions range from 510 to 768 pixels per line by 484 lines. High resolution sensors for machine vision and scientific applications with resolutions up to 2K×2K are available; cf. "A Four Million Pixel CCD Image Sensor", Lee, T. H. et al., SPIE Proceedings, Vol. 1242, *Charge-Coupled Devices and Solid State Optical Sensors*, February 1990, pp. 10–16. Linear sensors with up to 8K pixels are also available; cf. "Line Illumination System and Detector for Film Digitization", Milch, James R., SPIE Proceedings, Vol. 1242, *Charae-Coupled Devices and Solid State optical Sensors*, February 1990, pp. 66–77.

To support this range of resolution, the column counter 86X has 13-bits and row counter 86Y has 12-bits, allowing image rasters up to 8K×4K to be defined without requiring any additional resources. The count sequence length of each counter is determined by the programming of the programmable logic array PLA, thus providing versatility for any raster size. In addition, two dedicated inputs, HRST and VRST, are provided to the counter control 90 to directly reset the column and row counters, respectively.

The programmable logic array 66 creates several other control signals: an end-of-line EOL signal determines the conditions under which the column counter is reset and the row counter is incremented; an end-of-frame EOF signal determines when the row counter is reset. Other control signals include a signal on line START which is used to reset the defect correction block 120, and a signal on line HICCUP which introduces "hiccup."

In addition, the genlock block 100 and the defect correction block 120 provide important functions.

The genlock block 100 provides a means for synchronizing the timing generated by the ASIC to an image signal from an external source. It is expected that the imaging system 10 would include a commercially available synch stripper device (not shown) which would be used to remove reference timing signals from the image signal. The sync stripper provides both a vertical reference signal and an odd/even field indicator signal. The vertical reference signal consists of pulses occurring twice each frame, with one pulse in each of the two interlaced fields. Therefore, two pulses of the vertical reference signal occur during each video frame, while the odd/even field indicator goes through one complete cycle.

Figure 3:
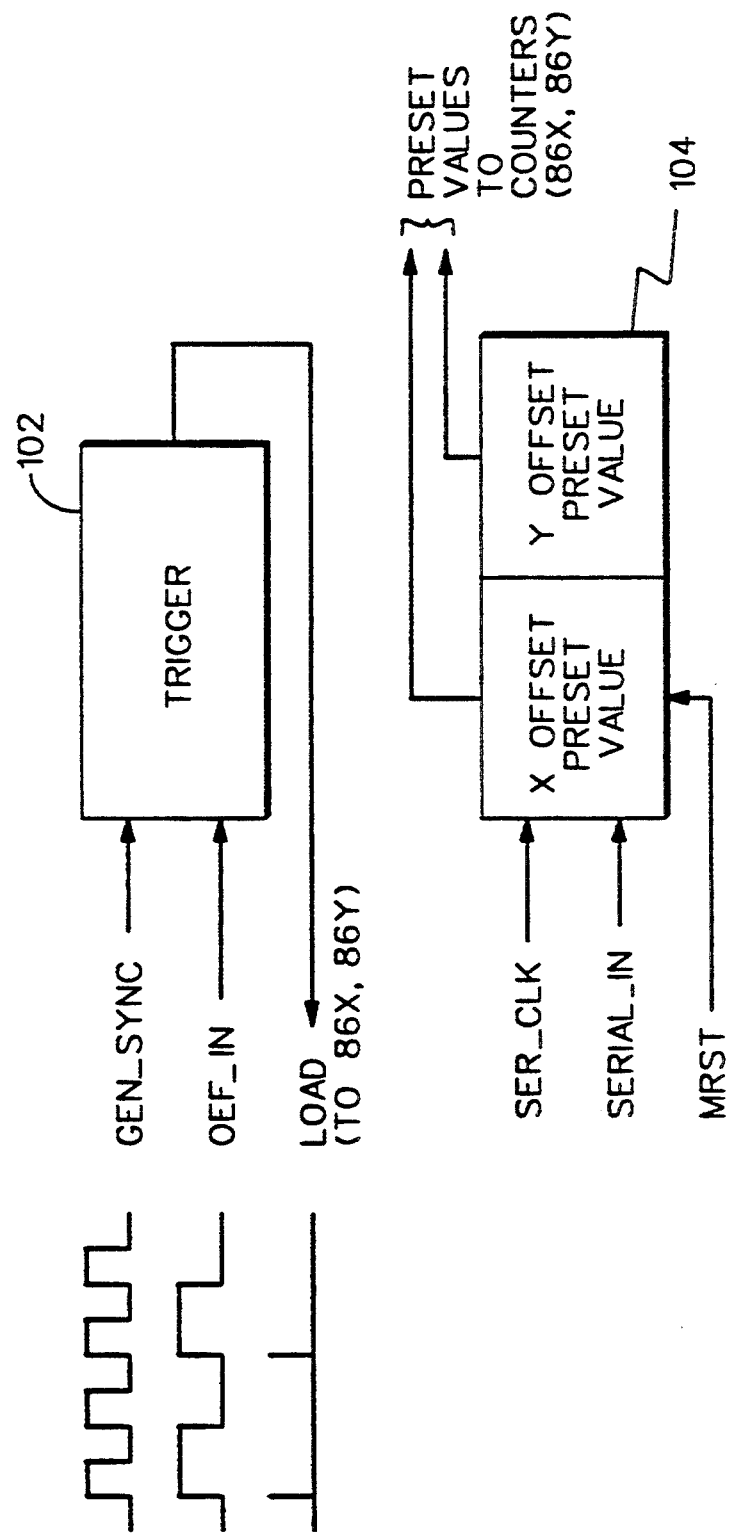
FIG. 3 is a simplified schematic representation of signal flow in the genlock functional block in the ASIC of FIG. 2.

Therefore, as shown in FIG. 3, a trigger circuit 102 in the genlock block 100 receives the vertical reference signal applied to line GENSYNC and the odd/even field indicator is applied to line OEF_IN. A rising edge on line GENSYNC generates a pulse on line LOAD when OEF_IN is low. When OEF_IN is high, the synchronization process is disabled. An internal serial register 104 is used to hold preset values that are loaded into the row and column counters 86Y, 86X by the synchronization process. The register 104 is cleared by the master reset signal MRST, and dedicated pins are used for the serial data input SERIAL_IN, serial clock SER_CLK, and to output the preset values and the load signal.

System timing is generated such that, when the register 104 is filled with all zeroes, the video signal produced by the imaging system 10 has the same video timing as the video image signal received by the aforementioned sync stripper. Loading the shift register 104 with a value other than zero causes the timing generated by the system to be offset with respect to the reference.

The defect correction block 120 provides the capability of generating a signal which identifies the location of defective pixels in the image so they can be corrected (concealed). A signal on line DEFECT identifies the location of defective pixels in the image. Such a signal may be used by other signal processing circuitry (not shown) to effect the desired correction.

Figure 4:
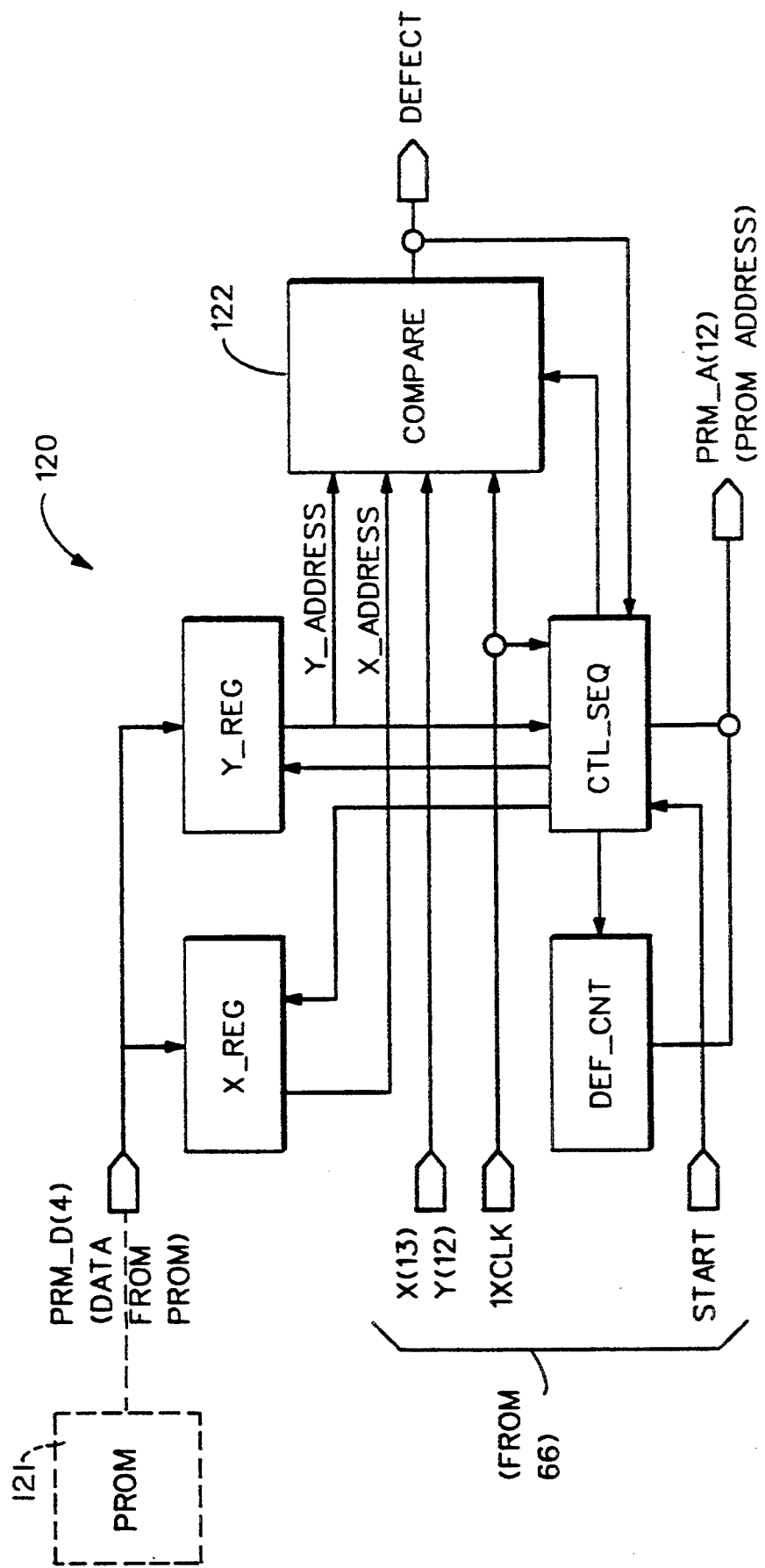
FIG. 4 is a simplified schematic representation of the defect correction functional block in the ASIC of FIG. 2.

As shown in FIG. 4, the defect correction block receives data on line PRM_D(4) to registers X_REG and Y_REG from an external memory device such as a programmable read-only memory (PROM) 121 which contains the coordinates of the defective pixel locations. The coordinates are the internal counter values which correspond to the defect locations; the coordinate information is encoded in the PROM in several consecutive addresses. Also encoded in the PROM is information to identify a second defect location, if any, that may be a small number of pixels away i.e., a closely-spaced defect.

The defect correction operation begins for each frame when the signal on line START is generated by the programmable logic array 66. The START signal resets the control sequencer CTL_SEQ and defect counter DEF_CNT; resulting in a reset of the PROM address PRM_A(12) to zero. Next, the control sequencer CTL_SEQ effects a sequence of read operations from the PROM to obtain the location of the first defect from the PROM. This location coordinate information is loaded into registers X_REG and Y_REG. A comparator 122 compares the raster count information on lines X(13), Y(12), and the defect location coordinate information on lines X-ADDRESS and Y-ADDRESS, to determine the present state of the counters with respect to the defect coordinate. When a match occurs, the defect signal DEFECT is set high for one pixel clock cycle.

If a second nearby defect has also been specified by the PROM data, the comparator will indicate such in a similar fashion. Successive read operations ascertain the remaining locations from the PROM.

After each defect is found, the control sequencer CTL_SEQ increments the defect counter DEF_CTR. The defect count (outputted from the defect counter) forms the upper most significant bit of the word on line PRM_A(12). The control sequencer controls the least significant bits of the PROM address to perform the sequence of read operations, causing the loading of the defect location information. This process is driven through successive sets of information, according to the operation of the defect counter DEF_CNT and the control sequencer CTL_SEQ. This process continues until the START signal from the programmable logic array PLA is issued, whereupon the defect correction cycle starts again.

When programming defect locations for a particular imaging system (such as a CCD image source) into the PROM, the counter values for the defect locations must be organized such that they are listed in order of readout occurrence, for example, starting from a line count of 0 (zero) and a pixel count of 0 (zero) in a system where the raster starts at a line and pixel count of zero. Then the location is encoded into consecutive locations in the PROM. This encoding may be provided according to a preferred packing algorithm illustrated in FIGS. 5 and 6. It should be recognized, however, that other packing algorithms and control strategies may be used.

To minimize the number of pins required, the PROM data word input PRM_D is only four bits wide. Each set of eight consecutive PROM locations can thus be used to contain the coordinates for either a single isolated defect, or for a pair of closely spaced defects. In the illustrated packing arrangement, which is but one example of such and is not intended as limiting, it is contemplated that these "closely spaced" defects are spaced less than, for example, 64 pixels apart to be correctly identified.

Figure 5:
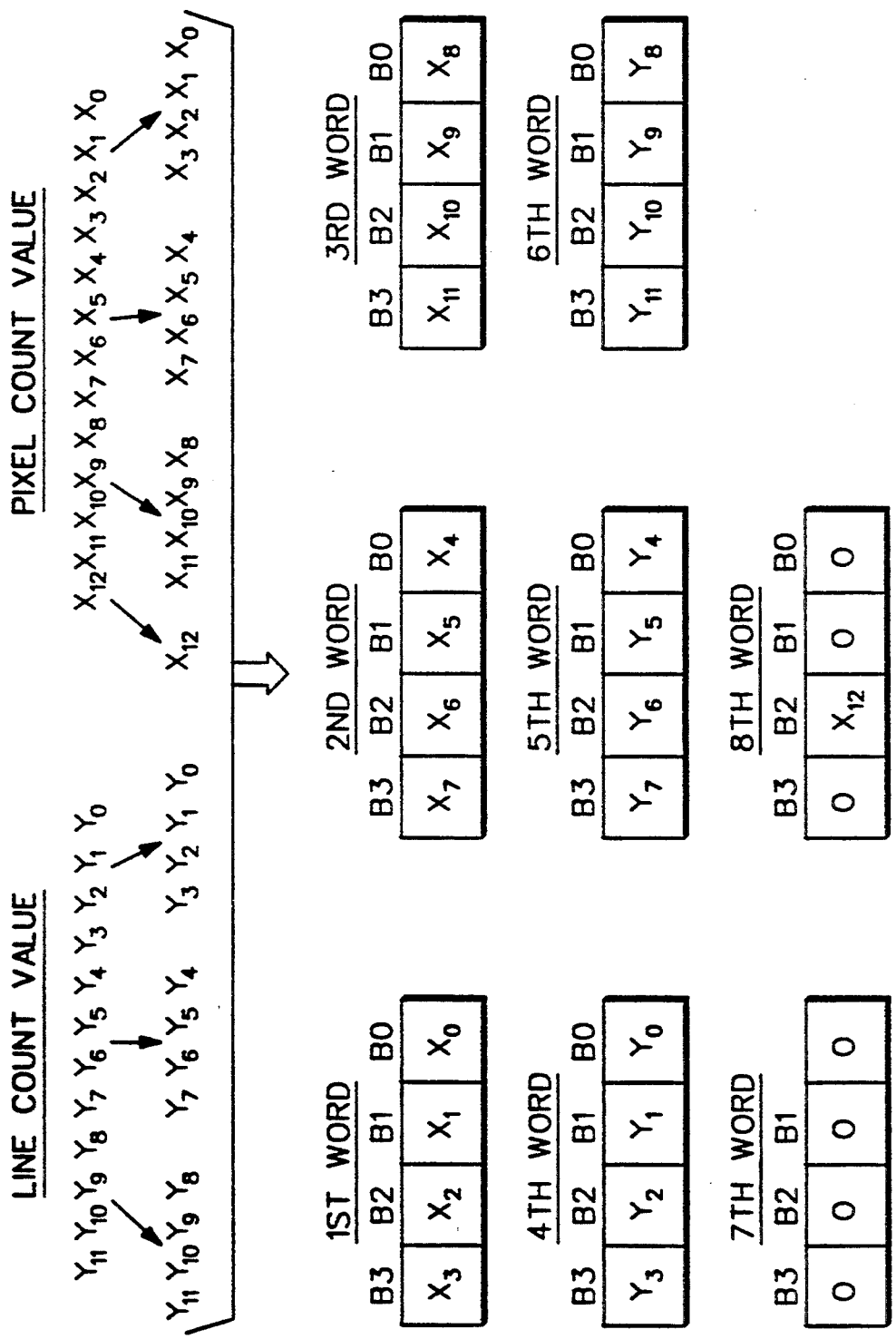
FIG. 5 is a simplified schematic representation of the data packing scheme used by the defect correction functional block of FIG. 4, when handling isolated (widely-spaced) pixel defects.

FIG. 5 illustrates the packing algorithm for isolated (widely-spaced) defects. The line count and pixel count values are first converted to binary values: a 12-bit line count value and a 13-bit pixel count value. Each value is then divided into several four-bit fields starting with the least significant four bits. The most significant bit that remains after the pixel counter value is divided into four bit fields is momentarily left as a single bit.

The first three data word positions in the PROM are used to hold three four-bit fields of the pixel count value, with the least significant four-bit field stored first. The next three data word positions in the PROM are used to hold all of the four-bit fields of the line count value, again with the least significant four bit field stored first. The next data word position is set to all zeros. The last data word of the eight-word group has its second-to-most significant bit position set equal to the most significant bit of the pixel count value, and the rest of the bits in the data word are set to zero.

Figure 6:
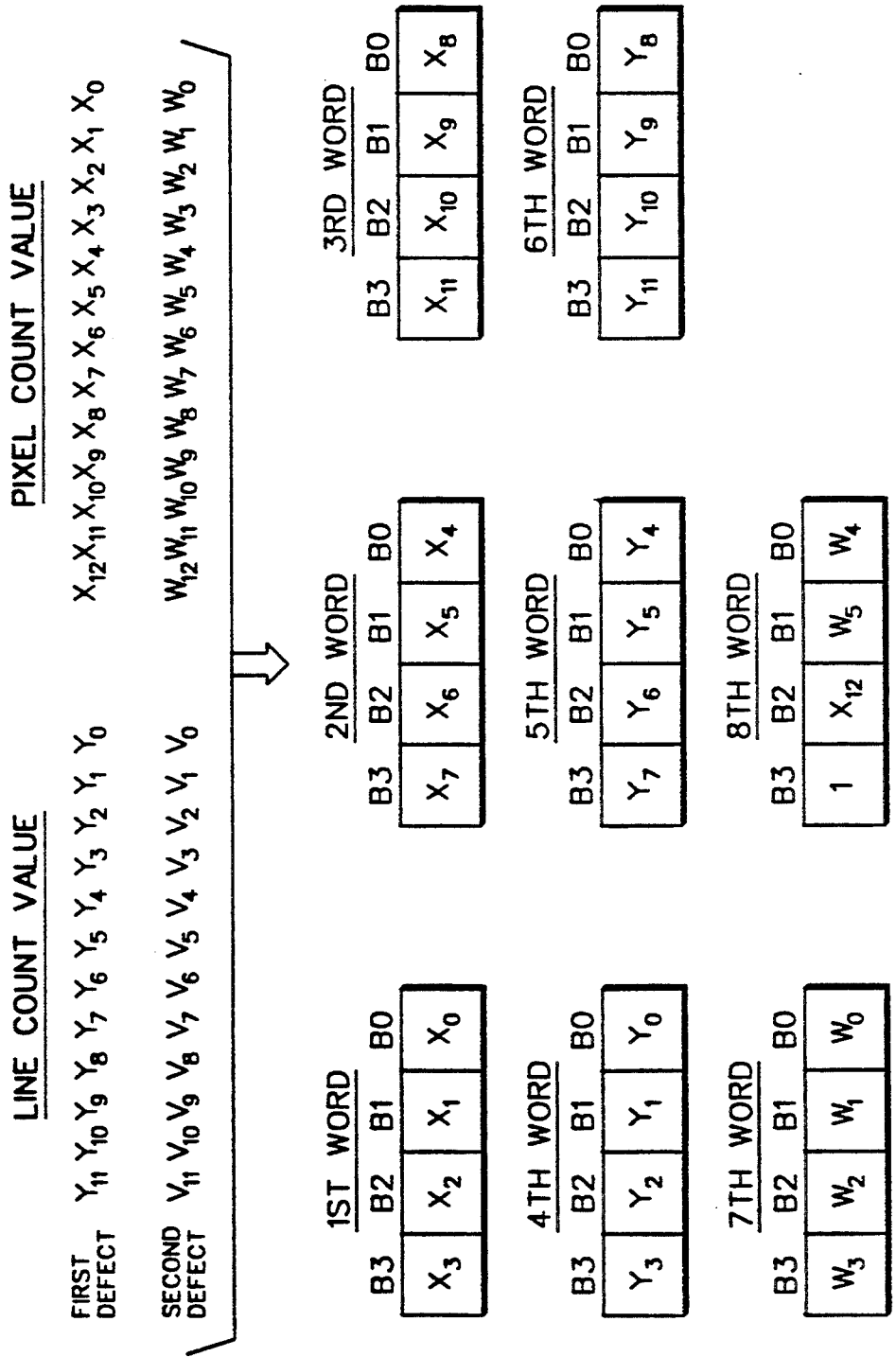
FIG. 6 is a simplified schematic representation of the data packing scheme used by the defect correction functional block of FIG. 4, when handling closely-spaced pixel defects.

As described above, a number of PROM addresses must be accessed to obtain the information needed to identify the defect locations. Thus, it takes a number of cycles to load the data into the ASIC 60. As shown in FIG. 6, the algorithm illustrated in FIG. 5 may be modified to identify a second nearby defect location which otherwise would not be correctable due to the constraints imposed by the number of pixel clock cycles required to load defect information from the PROM. To identify a pair of closely-spaced defects (for example, defects located less than 64 pixels apart), the packing algorithm is modified slightly from the algorithm illustrated in FIG. 5, as follows.

The line count and pixel count values for the first defect location are divided into four bit fields and stored in the same locations in the PROM data words as was done for time case of a single isolated defect. However, the bit positions which were filled with zeros in the single isolated defect case are now used to hold the 6 least significant bits of the X defect location address.

To identify the location of this second defect, the seventh PROM data word is used to hold the least significant four bits of the second defect's pixel count value. The two least significant bits of the eighth PROM data word are loaded with two of the next more significant bits (bits 4 and 5) of the defect location's pixel count value. Finally, the most significant bit of the eighth PROM data word is set to a 1 (one), which serves as a flag indicating that two defects are to be corrected.

When determining the location of the closely-spaced defect, the 6 least significant bits stored by the X register X_REG for the second defect are compared to the 6 least significant bit raster X count X(13). When a match occurs, the defect signal DEFECT is generated.

An alternative packing and control strategy is to store defective pixel location information with only a flag bit indicating the existence of a second closely spaced defective pixel. The least significant X location bits of the second closely space defective pixel are stored in subsequent (e.g. the next two) 4-bit words only when a second closely spaced defective pixel exists. The sequence controller checks the flag bit during the read out from the PROM and if the flag bit is not set (indicating no closely spaced defective pixel) reads only enough words from the PROM to extract the X and Y address of the defective pixel. If the flag bit is set, the sequence controller continues reading the X location information for the closely spaced defective pixel. It will be apparent that this concept is extendible to more than 1 closely spaced defective pixels. Additional flag bits indicating the number of successive closely spaced defective pixels may be provided and the sequence controller modified to read a corresponding number of X location information words in response to the flag bits.

A further extension could provide a number of flag bits comprising a code indicating several options for example using two flag bits, the code might be:
  00-no second closely spaced defective pixel;
  01-one second closely spaced defective pixel where additional PROM words are needed to specify the X location;
  10-a second defective pixel immediately following the first (no additional) PROM words used for identifying the location; or
  11-A third defective pixel immediately following the second (no additional) PROM words used for identifying the location.

The sequence controller would respond to the first two codes as previously described. For the last two codes, the sequencer would extend the duration of the defect signal for two clock cycles after the appropriate defect is signaled by the comparator.

In addition, the PLA 66 may be customized to address a problem found in the output of certain types of matrixed (row-and-column) image sensors that are likely to have column defects. The ability to simply correct defective columns is very important in such cases, and can greatly enhance the manufacturing yield of such image sensors. Such defects are much more objectionable than single isolated pixel defects. A column defect involves a large number of pixels and is, in general, impractical to correct by identifying each individual pixel location. A VIA-selectable option is therefore contemplated, whereby the defect correction function may be set to correct individual isolated defects (as described above) or column defects (in which only the column counter comparator is used).

The customization of the ASIC 60 (i.e., the programming of the device for an application) is effected by VIA selections during the fabrication of the device. The customization is non-volatile (permanent), and is not subject to erasure, as is experienced in EPROM-based designs. Customization also offers at least two other benefits.

One benefit is that the various features and functional blocks described in the foregoing may be customized to the application. Such features include (but are not limited to) the defect correction, genlock, phase shifting of input and output signals, and pixel rate timing frequency. Further, the internal characteristics of the device may be customized by appropriate VIA selections. For example, the characteristics of the counter control block 90 may be set such that it responds to signals HRST and VRST according to a predetermined level sensitivity, polarity, and the like. This flexibility in customization makes the contemplated ASIC 60 more versatile and more functional.

Secondly, the base architecture of the ASIC 60 can be fabricated in advance up to the VIA level. Customization therefore requires only one mask change, reducing both cost and turnaround time to below that of a gate array. Customization of the device for an application then requires processing the VIA, second level metal, and passivation layers to complete fabrication, a process that involves less steps than those in the production of a gate array. Programming of the ASIC 60 can then be fully automatic, resulting in very quick design turnaround. Moreover, even though each application requires different programming, the base architecture (layers below the VIA layer) remains unchanged. This, coupled with the savings in design time and generation of test vectors, offers a tremendous reduction in the time-to-market figure for production of the ASIC 60.

The customization, which is tailored to a particular application, may be completely automated. A coding sheet approach, similar to those used for specifying the programming of field programmable logic array devices, may be used to record the timing information. The coding sheet is editable by a user on a PC or workstation; another editable format may be used to specify the desired VIA options. It is contemplated that the development logic information used to program the Programmable Sequence Generator disclosed in U.S. Pat. No. 4,922,137, may be carried over to program the customizable timing and control ASIC 60. Associated software is then used to process these sets of customization information and automatically generates the proper VIA mask.

At the same time, a functional model of the customized programmable logic array 66 may be automatically generated along with a simulatable representation of the entire device with the chosen option selections. For further details on the coding sheet approach, see *Programmable Logic Devices Data Handbook* (1990 Edition), Signetics Company, pp. 291–292.

It is contemplated that the ASIC 60 be designed for testability. For example, customization would preferably include the test mode provision such that the outputs of the internal counters 86X and 86Y are observable directly at the output pins, and that the counters are operational in sections, such that each can be independently controlled. The defect correction counter can also be designed for operation in a test mode whereby it can be forced to count directly. The programmable logic array PLA input, output, and pipeline registers are preferably implemented as scan registers, enabling each transistor in the programmable logic array PLA to be individually tested. The scan registers may be connected into multiple scan chain to reduce test vector requirements.

With these provisions, the testability of the ASIC 60 is greatly enhanced. Test vector generation is made generic and thus can be automated for each application. Since the basic architecture of the device is unchanged in each application, one set of test stimuli (test input signals) may be used, whereby the test responses (output signals) of the tests will differ according to the specific programming in the programmable logic array PLA.

Thus, tests may be created as individual modules that examine specific blocks of the device for functionality, and comprehensive fault coverage of the device may be accomplished. To increase fault coverage further, it is contemplated that a custom test module be generated for each application. Such a module may be highly automated, thus reducing the task required of the chip designer in generating a thorough set of test vectors.

The invention has been described in detail with particular reference to preferred embodiments thereof, but it will be understood that variations and modifications can be effected within the spirit and scope of the invention.

What is claimed is:

1. A timing and control circuit for generating timing and control signals for an electronic image systems, comprising:
    a. means for generating an X, Y raster count;
    b. a memory for storing locations of defective pixels as a plurality of n-bit words identifying an X', Y'location of a defective pixel wherein said n-bit words contain the least significant X" location bits of a second closely spaced defective pixel when such second closely spaced defective pixel exists;
    c. a register for holding defective location information received from the memory;
    d. a comparator connected to the register for comparing the defective location information and the X, Y raster count and producing a defect signal when a match occurs;
    e. a control sequencer responsive to the defect signal and defective location information for:
        1) determining whether said closely spaced defect is specified;
        2) signaling the comparator to compare only the X raster count with the X" location information of said second closely spaced defective pixel for determining a next match when said second closely spaced defect is specified; and
        3) providing a plurality of memory addresses to effect a sequence of read operations from the memory to obtain the locations of subsequent defective pixels.

2. The timing and control circuit claimed in claim 1, wherein the X" location bits of the second closely spaced defective pixel is identified by m least significant bits of the X' location of said defective pixel.

3. A method of identifying defective pixels in an electronic imaging system, comprising the steps of:
    a. storing locations of defective pixels as a plurality of n-bit words identifying an X', Y' location of a defective pixel wherein said n-bit words contain the least significant X" location bits of a second closely spaced defective pixel when such second closely spaced defective pixel exists in a memory;
b. reading said plurality of n-bit words out of the memory and storing them in a register;
c. comparing the stored defective pixel location information in the register with an X,Y raster count; and
d. generating a defect signal when a match occurs and comparing only the X information of the X,Y raster count with the X" location information of said second closely spaced defective pixel when a closely spaced defective pixel is specified.

4. The method claimed in claim 3, wherein the X" location bits of said second closely spaced defective pixel is identified by m least significant bits of the X' location of said defective pixel.

* * * * *